US011615266B2

(12) United States Patent
Faller (10) Patent No.: US 11,615,266 B2
(45) Date of Patent: Mar. 28, 2023

(54) ADAPTIVE SAMPLING OF STIMULI FOR TRAINING OF MACHINE LEARNING BASED MODELS FOR PREDICTING HIDDEN CONTEXT OF TRAFFIC ENTITIES FOR NAVIGATING AUTONOMOUS VEHICLES

(71) Applicant: Perceptive Automata Inc., Boston, MA (US)

(72) Inventor: Avery Wagner Faller, Boston, MA (US)

(73) Assignee: PERCEPTIVE AUTOMATA, INC., Boston, MA (US)

( * ) Notice: Subject to any disclaimer, the term of this patent is extended or adjusted under 35 U.S.C. 154(b) by 244 days.

(21) Appl. No.: 17/081,211

(22) Filed: Oct. 27, 2020

(65) Prior Publication Data

US 2021/0133497 A1 May 6, 2021

Related U.S. Application Data

(60) Provisional application No. 62/929,807, filed on Nov. 2, 2019.

(51) Int. Cl.
*G06K 9/62* (2022.01)
*G08G 1/01* (2006.01)
(Continued)

(52) U.S. Cl.
CPC ......... *G06K 9/6254* (2013.01); *G05D 1/0221* (2013.01); *G06K 9/6256* (2013.01);
(Continued)

(58) Field of Classification Search
None
See application file for complete search history.

(56) References Cited

U.S. PATENT DOCUMENTS 7,269,516 B2 9/2007 Brunner et al.
8,175,333 B2 5/2012 Eaton et al.
(Continued)

OTHER PUBLICATIONS

Girdhar, R. and Ramanan, D., "Attentional Pooling for Action Recognition," 31st Conference on Neural Information Processing Systems (NIPS 2017), 12 pages.
(Continued)

*Primary Examiner* — David Perlman
(74) *Attorney, Agent, or Firm* — Fenwick & West LLP (57) ABSTRACT

A vehicle collects video data of an environment surrounding the vehicle including traffic entities, e.g., pedestrians, bicyclists, or other vehicles. The captured video data is sampled and presented to users to provide input on a traffic entity's state of mind. The user responses on the captured video data is used to generate a training dataset. A machine learning based model configured to predict a traffic entity's state of mind is trained with the training dataset. The system determines input video frames and associated dimension attributes for which the model performs poorly. The dimension attributes characterize stimuli and/or an environment shown in the input video frames. The system generates a second training dataset based on video frames that have the dimension attributes for which the model performed poorly. The model is retrained using the second training dataset and provided to an autonomous vehicle to assist with navigation in traffic.

20 Claims, 5 Drawing Sheets

(51) Int. Cl.
    *G06N 20/00*     (2019.01)
    *G05D 1/02*     (2020.01)
    *G06V 20/56*     (2022.01)
    *G06V 40/10*     (2022.01)
    *G05D 1/00*     (2006.01)

(52) U.S. Cl.
    CPC ........... *G06K 9/6262* (2013.01); *G06N 20/00* (2019.01); *G06V 20/56* (2022.01); *G06V 40/10* (2022.01); *G08G 1/0112* (2013.01); *G08G 1/0125* (2013.01); *G05D 1/0088* (2013.01); *G05D 2201/0213* (2013.01); *G06V 2201/08* (2022.01)

(56) References Cited

U.S. PATENT DOCUMENTS

| | | | |
|---|---|---|---|
| 8,854,457 | B2 | 10/2014 | De Vleeschouwer et al. |
| 9,881,221 | B2 | 1/2018 | Bala et al. |
| 10,186,123 | B2 | 1/2019 | Kanaujia et al. |
| 11,263,549 | B2 * | 3/2022 | Dronen .................. G06V 20/56 |
| 2015/0213555 | A1 | 7/2015 | Barfield, Jr. et al. |
| 2017/0153639 | A1 | 6/2017 | Stein |
| 2017/0270374 | A1 | 9/2017 | Myers et al. |
| 2018/0146198 | A1 | 5/2018 | Atluru et al. |
| 2019/0072966 | A1 * | 3/2019 | Zhang .................. G05D 1/0088 |
| 2020/0364508 | A1 * | 11/2020 | Gurel ...................... G06V 20/41 |
| 2020/0364520 | A1 * | 11/2020 | Brandes ............... G06K 9/6224 |

OTHER PUBLICATIONS

He, K., et al. "Mask R-CNN," Computer Vision and Pattern Recognition 1703.06870v3, Jan. 24, 2018, 12 pages.
International Search Report and Written Opinion, PCT Application No. PCT/US2018/063459, dated Feb. 7, 2019, 13 pages.
Karmarkar, T., "Regional Proposal network (RPN)—Backbone of Faster R-CNN," Aug. 18, 2018, 6 pages, [Online][Retrieved Jan. 5, 2019], Retrieved from the internet <URL:https://medium.com/@tanaykarmarkar/region-proposal-network-rpn-bac>.
Kotseruba, I., et al., Joint Attention in Autonomous Driving (JADD), Robotics 1609.04741v5, Apr. 24, 2017, 10 pages.
Newell, A., et al., "Stacked Hourglass Networks for Human Pose Estimation," Computer Vision and Pattern Recognition 1603.06937v2, Jul. 26, 2016, 17 pages.
Ren, S. et al. "Faster R-CNN: Towards Real-Time Object Detection with Region Proposal Networks," Advances in Neural Information Processing Systems 28 (NIPS 2015), 9 pages.
Ren, S. et al. "Faster R-CNN: Towards Real-Time Object Detection with Region Proposal Networks," Computer Vision and Pattern Recognition 1506.01497v3, Jan. 6, 2016, 14 pages.
Santoro, A. et al., "A neural approach to relational reasoning," Jun. 6, 2017, 6 pages, [Online][Retrieved Jan. 5, 2019], Retrieved from the internet <URL:https://deepmind.com/blog/neural-approach-relational-reasoning/>.
Santoro, A. et al., "A simple neural network module for relational reasoning," Computation and Language 1706.01427, Jun. 5, 2017, 16 pages.
Schneemann, F., et al., "Context-based Detection of Pedestrian Crossing Intention for Autonomous Driving in Urban Environments," 2016 IEEE/RSJ International Conference on Intelligent Robots and Systems (IROS), Oct. 2016, 6 pages.
Watters, N., et al.," Visual Interaction Networks," Computer Vision and Pattern Recognition 1706.01433v1, June 5, 2017, 14 pages.
Zhao, H., et al., "Pyramid Scheme Parsing Network," Computer Vision and Pattern Recognition 1612.01105v2, Apr. 27, 2017, 11 pages.

* cited by examiner

```
┌─────────────────────────────────────────────────────────────┐
│ Generate training dataset for a subset of video frames,     │
│ wherein a dimension attribute describes the video frames    │
│                            410                              │
└─────────────────────────────────────────────────────────────┘
                              ↓
┌─────────────────────────────────────────────────────────────┐
│              Train model using training dataset             │
│                            420                              │
└─────────────────────────────────────────────────────────────┘
                              ↓
┌─────────────────────────────────────────────────────────────┐
│         Monitor performance of model for training dataset   │
│                            430                              │
└─────────────────────────────────────────────────────────────┘
                              ↓
┌─────────────────────────────────────────────────────────────┐
│   Identify a dimension attribute for which model            │
│   performance was poor                                      │
│                            440                              │
└─────────────────────────────────────────────────────────────┘
                              ↓
┌─────────────────────────────────────────────────────────────┐
│ Select a second subset of video frames, wherein the         │
│ dimension attribute describes the video frames              │
│                            450                              │
└─────────────────────────────────────────────────────────────┘
                              ↓
┌─────────────────────────────────────────────────────────────┐
│ Generate second training dataset for the second subset of   │
│ video frames                                                │
│                            460                              │
└─────────────────────────────────────────────────────────────┘
                              ↓
┌─────────────────────────────────────────────────────────────┐
│           Retrain model using second training dataset       │
│                            470                              │
└─────────────────────────────────────────────────────────────┘
                              ↓
┌─────────────────────────────────────────────────────────────┐
│ Provide trained model to autonomous vehicle to assist with  │
│ navigation in traffic                                       │
│                            480                              │
└─────────────────────────────────────────────────────────────┘
```

ADAPTIVE SAMPLING OF STIMULI FOR TRAINING OF MACHINE LEARNING BASED MODELS FOR PREDICTING HIDDEN CONTEXT OF TRAFFIC ENTITIES FOR NAVIGATING AUTONOMOUS VEHICLES

CROSS-REFERENCE TO RELATED APPLICATION

This application claims the benefit of U.S. Provisional Application No. 62/929,807 filed Nov. 2, 2019, which is incorporated by reference in its entirety.

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The disclosure relates in general to generating datasets for training machine learning based models for use in navigating autonomous vehicles and more specifically to the adaptive sampling of stimuli for training machine learning based models that predict hidden contexts of traffic entities.

BACKGROUND

An autonomous vehicle uses different types of sensors to receive input describing the surroundings (or environment) of the autonomous vehicle while driving through traffic. For example, an autonomous vehicle may perceive the surroundings using camera images and lidar scans. The autonomous vehicle determines whether an object in the surroundings is stationary, for example, buildings or trees or the object is non-stationary, for example, a pedestrian, a vehicle, and so on. The autonomous vehicle system predicts the motion of non-stationary objects to make sure that the autonomous vehicle is able to navigate through non-stationary obstacles in the traffic.

Conventional systems predict motion of non-stationary objects using kinematics. For example, autonomous vehicles may rely on methods that make decisions on how to control the vehicles by predicting "motion vectors" of people near the vehicles. This is accomplished by collecting data of a person's current and past movements, determining a motion vector of the person at a current time based on these movements, and extrapolating a future motion vector representing the person's predicted motion at a future time based on the current motion vector. However, these techniques fail to predict motion of certain non-stationary objects for example, pedestrians, bicyclists, and so on. For example, if the autonomous vehicle detects a pedestrian standing in a street corner, the motion of the pedestrian does not help predict whether the pedestrian will cross the street or whether the pedestrian will remain standing on a street corner. Similarly, if the autonomous vehicle detects a bicyclist in a lane, the current motion of the bicycle does not help the autonomous vehicle predict whether the bicycle will change lanes. Failure of autonomous vehicles fail to accurately predict motion of non-stationary traffic objects results in unnatural movement of the autonomous vehicle, for example, as a result of the autonomous vehicle suddenly stopping due to a pedestrian moving in the road or the autonomous vehicle continuing to wait for a person to cross a street even if the person never intends to cross the street.

Machine learning based models, for example, neural networks are used for making various predictions to be able to navigate autonomous vehicles smoothly through traffic. The quality of these machine learning based models depends on the quality and the amount of training data used for training them. Current techniques for generating training data for training these machine learning based models require user input, for example, to generate labeled training datasets. However, obtaining large scale user input to build such a training dataset is time consuming, and expensive.

SUMMARY

A vehicle collects video data of an environment surrounding the vehicle using sensors, for example, cameras mounted on the vehicle. The video data comprises a sequence of video frames. The driving environment includes at least one traffic entity, such as a pedestrian, bicyclist, or another vehicle. A traffic entity is associated with a hidden context, for example, a state of mind of a pedestrian indicating an intention to cross a path of the vehicle or a measure of awareness of the vehicle. The captured video data is sampled to obtain a first subset of the video frames. The system generates a training dataset using the first subset of the video frames. The system provides each video frame in the first subset of the video frames to users via a user interface. The users provide user responses describing a hidden context attribute describing a traffic entity in the video frame, based on which the system annotates the video frame. The plurality of annotated video frames for the first subset of the video frames makes up the training dataset.

The system trains a machine learning based model, for example, a neural network using the training dataset. The machine learning based model is configured to receive an input video frame and predict the hidden context attribute describing a traffic entity displayed in the input video frame. The video frames input to the machine learning based model may be described by at least one dimension attribute. A dimension attribute may be a characteristic describing stimuli and/or an environment shown in the video frames. For example, a dimension attribute may be a city in which the video frame was taken, a size of the city in which the video frame was taken, a type of street shown in the video frame, and an activity of a pedestrian shown in the video frame. The system evaluates the performance of the machine learning based model for a plurality of video frames, each associated with one or more dimension attributes. In some embodiments, each of the one or more dimension attributes may be associated with a unique identifier value. The system identifies dimension attributes for which the performance of the machine learning model is poor, i.e., below a threshold, and selects a subset of video frames having the identified the dimension attributes, i.e., the second subset of video frames. For example, the system may determine that the machine learning model performs poorly at predicting the hidden context attribute for an input video frame having a first dimension attribute of being captured in a city and a second dimension attribute of being captured on a rainy day. The system may select the second subset of video frames to include additional video frames that were captured in a city and video frames captured on a rainy day. The system seeks further user input on the second subset of video frames, thereby generating a second training dataset. The machine learning based model is retrained with the second training dataset and provided to an autonomous vehicle to assist with navigation of the autonomous vehicle.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A busy driving environment may include a number of traffic entities, such as pedestrians, bicyclists, and other vehicles. For example, a pedestrian may decide to cross a busy street and a bicyclist may drive in a bike lane alongside vehicles. The traffic entities are associated with hidden context comprising attributes. The hidden context attributes, along with external factors such as road signs, traffic lights, and other traffic entities' actions, contribute to the decisions traffic entities make with regards to their visible actions and movements. Hidden context attributes are distinct from attributes that describe the movement, for example, motion vector of the traffic entity. Hidden context attributes describe a state of mind of a pedestrian representing a traffic entity. For example, a state of mind may include a measure of awareness of the vehicle in the mind of the traffic entity. The movement of the traffic entity is determined by the hidden context, for example, if the state of mind indicates that the user plans on crossing the street, the user is likely to move in front of the vehicle, even if the motion vector indicates otherwise. Unlike human drivers, autonomous vehicles lack the innate ability to judge traffic entities' states of mind.

The system described herein presents video frames including activities of traffic entities to a set of users, who provide input on the traffic entities' behavior. The video frames may be from the point of view of the autonomous vehicle, such that the user input provides information on the traffic entity relative to the autonomous vehicle. For example, the set of users may provide responses to questions on how likely a traffic entity is to cross the path of the autonomous vehicle, direction in which the traffic entity is traveling, and how likely it is that the traffic entity is aware of the autonomous vehicle's presence, for example. The system annotates the video frames based on the user responses. For example, the system may determine values of one or more attributes that represents statistical distribution of the user responses describing the hidden context associated with traffic entity and annotate the video frame with the one or more attributes. The user responses are used to build a dataset that is used in training a plurality of machine learning based models. The machine learning based models take, as input, a set of video frames showing traffic entities, and provide output that predict one or more hidden context attributes describing the traffic entities' states of mind and actions, i.e., the traffic entities' behavior. The machine learning based model may be provided to an autonomous vehicle. The autonomous vehicle may use the predicted user distribution of the traffic entities' states of mind to assist in the navigation of the autonomous vehicle. In particular, the machine learning based model may assist with multi-object tracking, path planning, motion planning, and/or other navigation tasks relevant to the autonomous vehicle.

The performance of the machine learning based model may be evaluated by comparing the model predicted hidden context about the traffic entities in the input video frames to user responses about the traffic entities' behavior. In particular, the performance of the machine learning based model may vary depending on a dimension attribute characterizing the set of input video frames. If a dataset used to train the model includes a higher frequency of user responses relating to a particular stimulus, the model may perform better in response to input video frames that show that stimulus, as opposed to others, for example. A dimension attribute describes stimuli within a video frame and may include a characterization of a type of traffic entity, a traffic entity's actions, and an environment shown by the video frames, among other characteristics. The system determines the dimension attributes for which the model has poor performance and selects video frames with those dimension attributes. The system generates a second training dataset based on the video frames that have dimension attributes for which the model performed poorly, and retrains the machine learning based model based on the second training dataset Systems and methods for predicting user interaction with vehicles are disclosed in the U.S. patent application Ser. No. 15/830,549, filed on Dec. 4, 2017 which is incorporated by reference herein in its entirely.

System Environment

Figure 1:
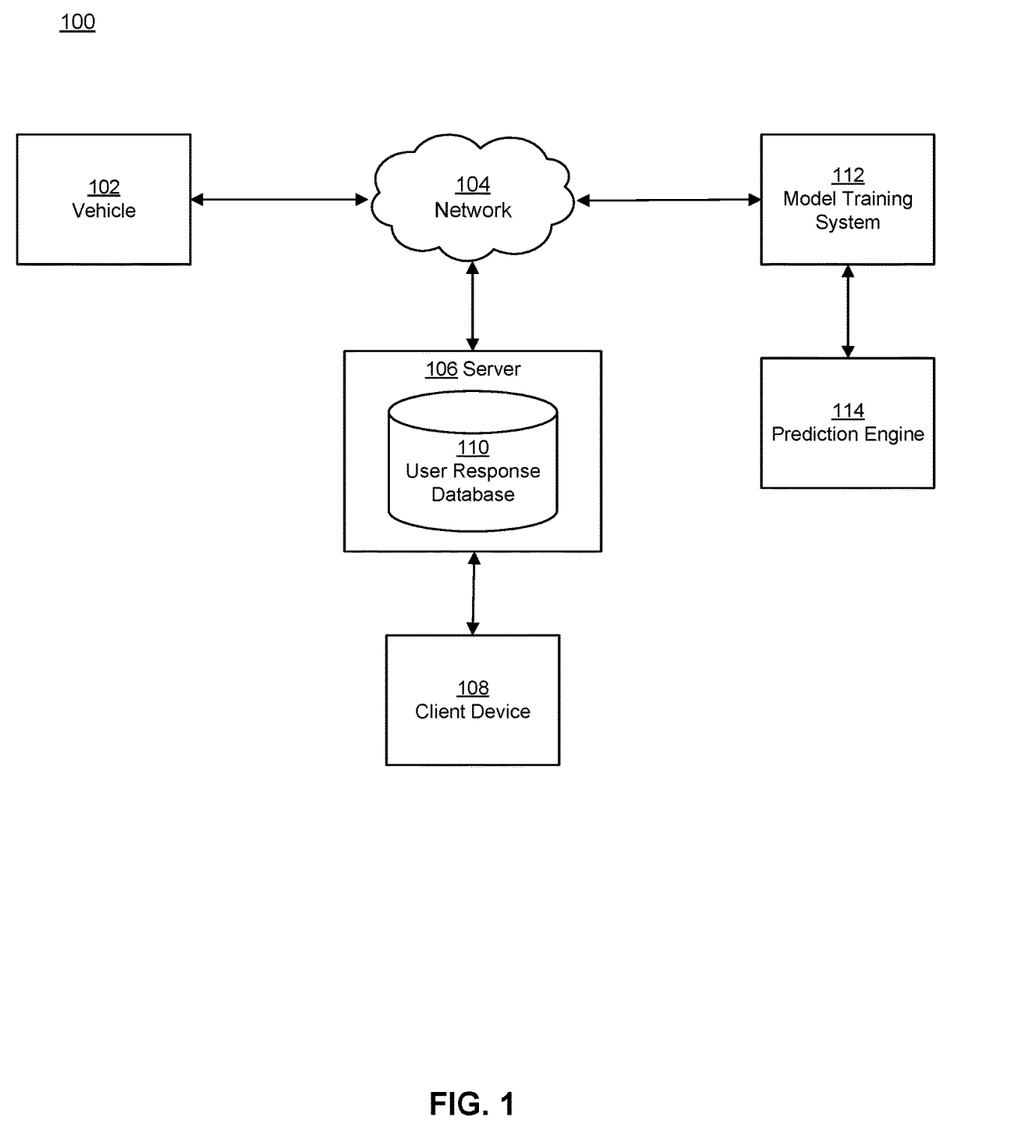
FIG. 1 shows an overall system environment illustrating a system that predicts a traffic entity's state of mind based on user input, in accordance with one or more embodiments.

FIG. 1 shows an overall system environment illustrating a system 100 that predicts hidden context describing traffic entities based on user input, in accordance with one or more embodiments. The system environment 100 includes a vehicle 102, a network 104, a server 106 which hosts a user response database 110, a client device 108, a model training system 112, and a prediction engine 114. The network 104 connects the vehicle 102 with the server 106 and the model training system 112.

The vehicle 102 may be any manual or motorized vehicle, such as a car, bus, or bicycle. In some embodiments, the vehicle 102 may be an autonomous vehicle. The vehicle 102 monitors its surrounding environment, capturing events in the surrounding environment through video data. For example, the vehicle 102 may include an image sensor, or a camera that records a sequence of video frames that capture activities in the surrounding environment. Data may be collected from cameras or other sensors including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium such as a compact flash drive, hard drive, solid state drive or dedicated data logger. The video frames may include traffic entities and their actions, such as a pedestrian crossing a crosswalk in front of the vehicle 102, a bicyclist riding alongside the vehicle 102 in a bike lane, and other vehicles waiting to turn on to a cross street.

The network 104 may be any wired and/or wireless network capable of receiving sensor data collected by the vehicle 102 and distributing it to the server 106, the model training system 112, and, through the model training system 112, the prediction engine 114. In some embodiments, the network 104 may use standard communication protocols and comprise local area networks, wide area networks, or a combination thereof.

The server 106 may be any computer implemented system capable of hosting, providing content to users, and receiving input from users on the content. The content may include image, video, and text information. The server 106 provides the content to each of the users via the user's client device 108. The server 106 may present, to the users, the content and request input on the content. Users may be asked questions relating to hidden context of a traffic entity, for example, state of mind of an individual corresponding to a traffic entity to which the users can respond. In some embodiments, the users may respond by ranking how likely a state of mind is, using the Likert scale. For example, questions presented to the user may relate to how likely a traffic entity is to cross the path of the autonomous vehicle, the direction in which the traffic entity is traveling, and how likely it is that the traffic entity is aware of the autonomous vehicle's presence. The server 106 derives an annotation for the video frames shown to the users, wherein the annotation describes the statistical distribution of the user responses. In an embodiment, the statistical distribution comprises a mean value and standard deviation. Other embodiments may use other measures of statistical distribution, for example, any measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above.

The user responses are stored in the user response database 110. The server 106 may be capable of receiving content and sending data via the network 104, as well. For example, the server 106 receives the content from the vehicle 102 and provides data on the user responses to the model training system 112.

Each user provides input on the content presented by the server 106 via a client device 108. The client device 108 is a computing device capable of receiving user input, as well as transmitting and/or receiving data via the network 104. In some embodiments, the client device 108 may be a computer system, such as a desktop or a laptop computer. The client device 108 may also be a device with mobile device that enables the user to interact with the server 106.

The model training system 112 trains machine learning based models that predict the state of mind, including intentions and behavior, of traffic entities in areas surrounding the vehicle 102. Different machine learning techniques can be used to train the machine learning model including, but not limited to decision tree learning, association rule learning, artificial neural network learning, convolutional neural networks, deep learning, support vector machines (SVM), cluster analysis, Bayesian algorithms, regression algorithms, instance-based algorithms, and regularization algorithms. In some embodiments, the model training system 112 may withhold portions of the training dataset (e.g., 10% or 20% of full training dataset) and train a machine learning model on subsets of the training dataset. For example, the model training system 112 may train different machine learning models on different subsets of the training dataset for the purposes of performing cross-validation to further tune the parameters. In some embodiments, because candidate parameter values are selected based on historical datasets, the tuning of the candidate parameter values may be significantly more efficient in comparison to randomly identified (e.g., naïve parameter sweep) candidate parameters values. In other words, the model training system 112 can tune the candidate parameter values in less time and while consuming fewer computing resources.

The machine learning based models are trained using a process of progressively adjusting the parameters of model in response to the characteristics of the images and summary statistics given to it in the training phase to minimize the error in its predictions of the summary statistics for the training images. In one embodiment of the model training system 112, the algorithm can be a deep neural network. In this embodiment, the parameters are the weights attached to the connections between the artificial neurons comprising the network. Pixel data from an image in a training set collated with human observer summary statistics can serve as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human response statistics given at the input. The difference between the numbers that the network output and the human response statistics provided at the input comprises an error signal. An algorithm (e.g., backpropagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set collected. At the end of this process the model is "trained", which in some embodiments, means that the difference between the summary statistics output by the neural network and the summary statistics calculated from the responses of the human observers is minimized.

Ultimately, predictions of a traffic entity's state of mind facilitate the navigation of autonomous vehicles, in particular with multi-object tracking, path planning, motion planning, and/or other navigation tasks relevant to the autonomous vehicle. The model training system 112 takes in the data on the user responses to video frames showing the activities of traffic entities and models the statistical distribution of the user responses. In one embodiment, the model training system 112 receives image, video, and/or text information and accompanying user responses from the database 110 over the network 104. In some embodiments, the user responses may include discrete values of text or free text responses. The model training system 112 can use images, video segments and text segments as training examples to train an algorithm and can create labels from the accompanying user responses based on the trained algorithm. These labels indicate how the algorithm predicts the behavior of the people in the associated image, video, and/or text segments. After the labels are created, the model training system 112 provides them to the prediction engine 114.

The prediction engine 114 outputs a predicted distribution of user responses associated with a video frame. The predicted distribution of user responses may include predictions on identified traffic entities and on the states of mind of the traffic entities. The model training system 121 may train an algorithm in the prediction engine 114. The output of the prediction engine 114 is used in facilitating the navigation of autonomous vehicles. For example, the output of the prediction engine 114 may be used to determine the control signals provided to a control system of the autonomous vehicle to navigate the autonomous vehicle including the accelerator, steering, braking system, and so on.

Figure 2:
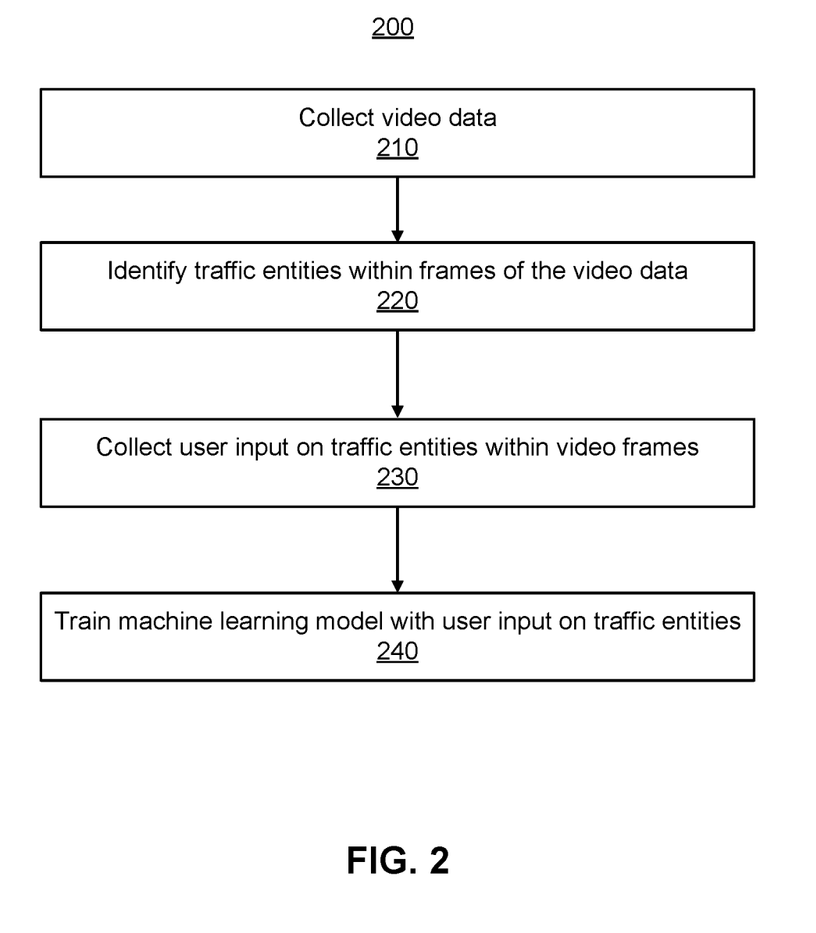
FIG. 2 is a flowchart illustrating a method for training, with user input, a machine learning model that predicts a traffic entity's state of mind, in accordance with one or more embodiments.

FIG. 2 is a flowchart illustrating a method 200 for training, with user input, a machine learning model that predicts a traffic entity's state of mind, in accordance with one or more embodiments.

A camera or another image sensor collects 210 video data of a driving environment. In some embodiments, the video data may be recorded from a vehicle (e.g., the vehicle 102). The video data comprises a plurality of video frames. The video frames may include traffic entities, such as pedestrians, bicyclists, and other motorized vehicles that are in the driving environment. The traffic entities may be stationary or moving in the video. The captured video data is sent to a server (e.g., the server 106) over a network (the network 104).

The server provides the video frames to a prediction engine (e.g., the prediction engine 114) that identifies 220 the traffic entities within the video frames. The server subsequently presents the video frames to a plurality of users, each of whom access the video frames via a client device (e.g., the client device 108). In some embodiments, a plurality of sensors may collect sensor data, other than image data, about the driving environment about the vehicle. For example, the sensor data may include lidar and radar, among others.

The server requests and collects 230 user inputs on each of the traffic entities within the video frames. The users may provide responses as to whether the prediction engine correctly identified each of the traffic entities, and if not, correctly identify the traffic entities. The users may also provide responses on a state of mind of each of the traffic entities. For example, the user may be asked how likely the traffic entity is to cross the path of the autonomous vehicle, the direction in which the traffic entity is traveling, and how likely it is that the traffic entity is aware of the autonomous vehicle's presence, among other questions on the traffic entity's behavior and intentions. In responding to the questions on the traffic entity's state of mind, the user may rank the likelihood of occurrence of a particular state of mind. For example, the user may rank, from a scale of one to five, how likely a person is to cross the street. A plurality of user responses may be aggregated to form a distribution of user responses relating to the traffic entity's activities.

A machine learning based model is trained 240 with the user input on the traffic entities in the video frames. The machine learning model may be trained by a model training system (e.g., the model training system 112). The trained model ultimately predicts, via a prediction engine (e.g., the prediction engine 114) a distribution of user responses about a traffic entity.

Adaptive Sampling of Stimuli in Training Datasets

The machine learning based model may perform differently in response to varying input video frames. The model's performance may depend on the training dataset used to train the model. For example, if the training dataset is skewed to mostly include user responses on hidden context attributes, i.e., traffic entity activities, on small, quiet streets, the model may not accurately predict hidden context attributes for traffic entities on a major roadway or highway. The system determines dimension attributes, i.e., characteristics, of video frames input into the model for which the model performs poorly and further selects video frames with those characteristics to generate a new training dataset.

Figure 3:
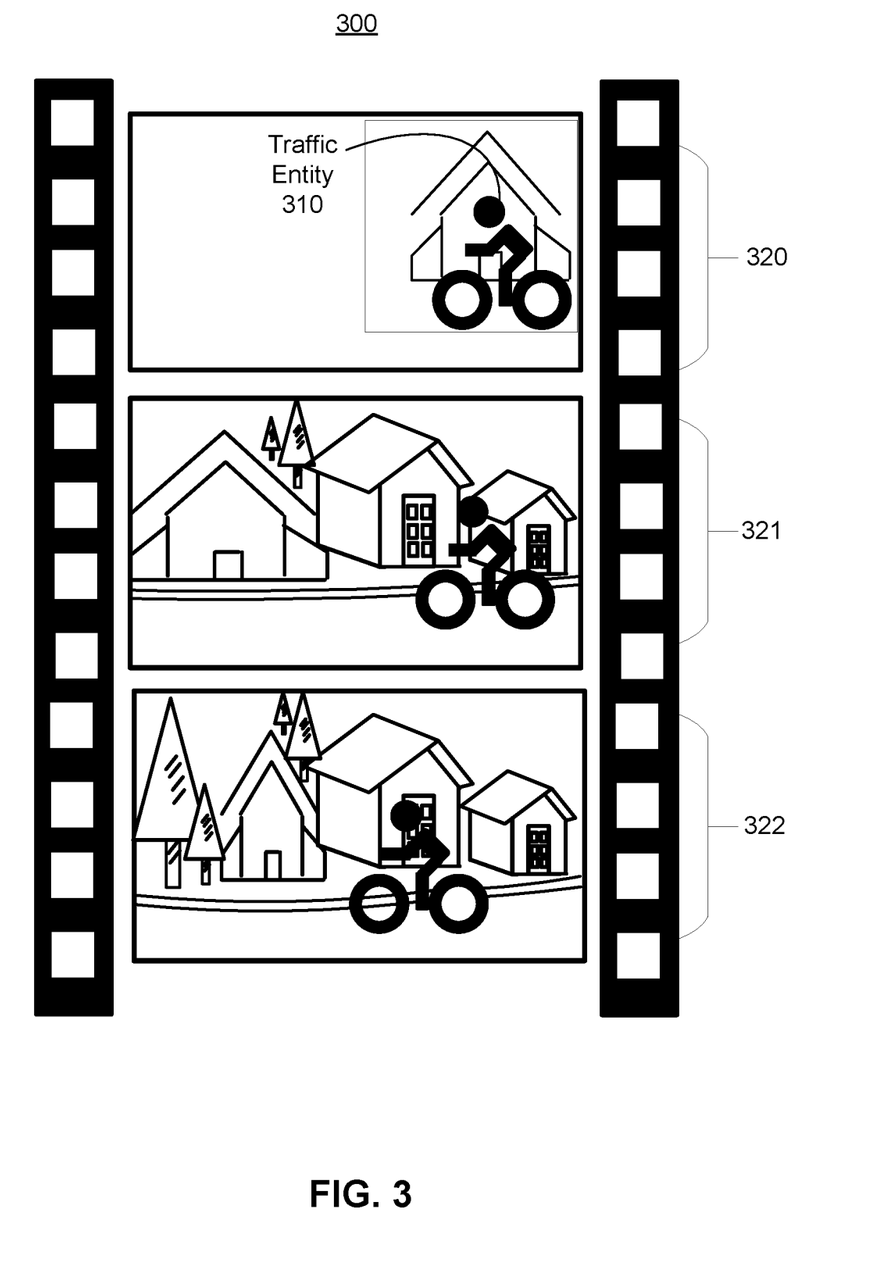
FIG. 3 shows an example of a stimulus characterized by a dimension attribute in a subset of video frames, in accordance with one or more embodiments.

FIG. 3 shows an example of a stimulus characterized by a dimension attribute in a subset of video frames 300, in accordance with one or more embodiments. The subset of video frames 300 includes a traffic entity 310 within video frames 320-322. FIG. 3 shows the traffic entity 310 as a bicyclist. The traffic entity 310 may cross in front of the autonomous vehicle capturing the video data that includes the subset of video frames 300.

Each of the video frames 320-322 may be characterized by one or more dimension attributes. Dimension attributes may describe a type and/or activity of a traffic entity within a video frame. For example, the video frame 320 may be described by a dimension attribute specifying that the traffic entity 310 is on a bicycle. Dimension attributes may also describe an environment shown by the video frames. For example, the dimension attributes for the video frames 321 and 322 may specify a suburban area. In some embodiments, metadata about the subset of video frames 300 may be used to specify dimension attributes. Metadata may include geographic location at which the subset of video frames 300 was captured, for example. Other examples of dimension attributes may include demographic subsets of pedestrians, a speed at which the traffic entity is traveling, weather conditions that may impact visibility of the environment shown in the video frames (e.g., rain and/or snow), traffic entities traveling in groups (e.g., large groups of pedestrians and/or bicyclists), and attributes characterizing terrain, among others. The system may assign dimension attributes to a video frame that are not listed herein. In some embodiments, while generating a training dataset for the machine learning based model, the system may provide users with a subset of video frames and receive input from users on dimension attributes that describe the subset of video frames. In other embodiments, the system may assign dimension attributes to the subset of video frames before seeking user input on hidden contexts of traffic entities. The system may use semantic segmentation and/or object recognition to automatically assign dimension attributes to the subset of video frames.

Figure 4:
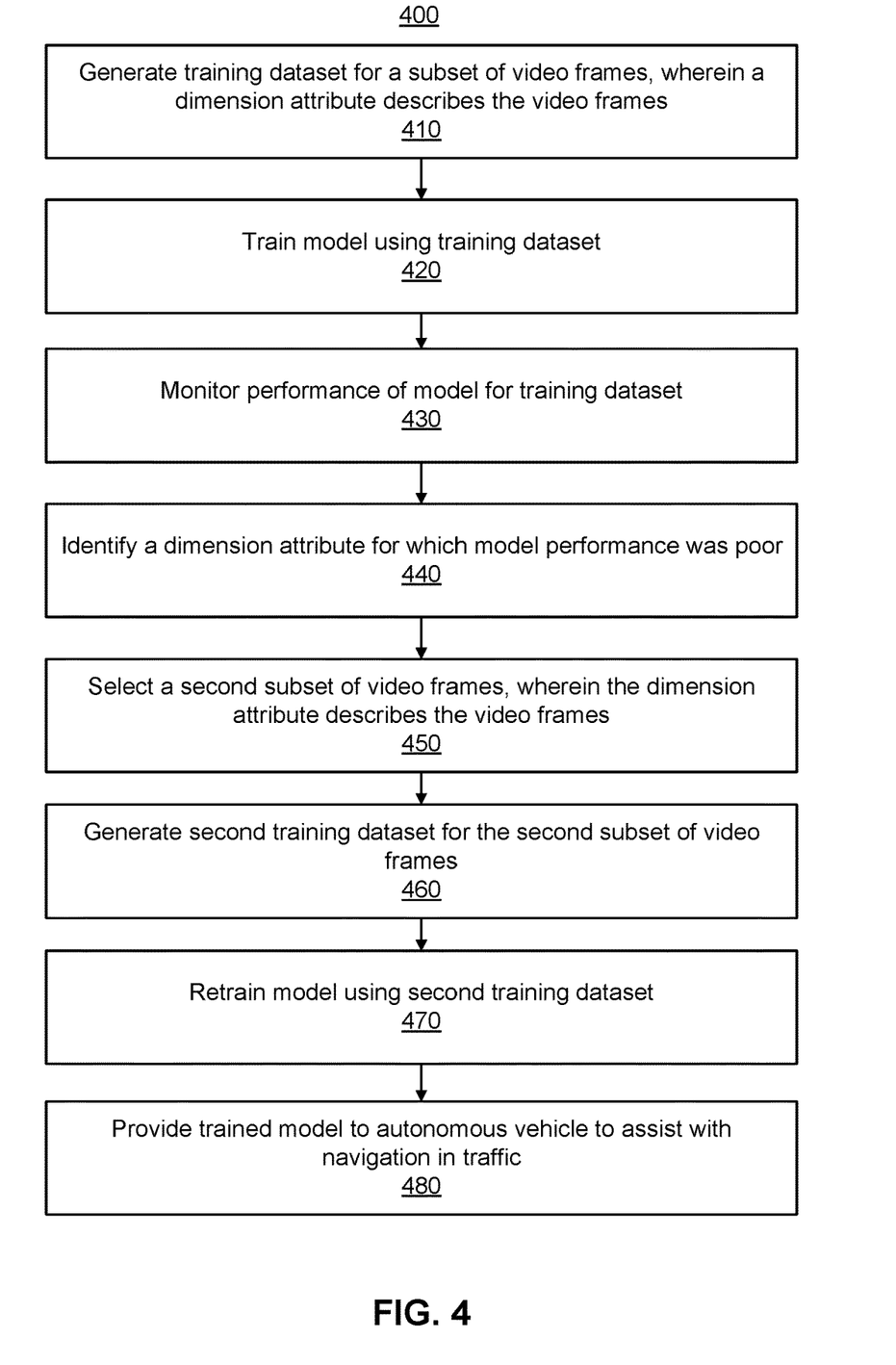
FIG. 4 is a flowchart illustrating a method for the adaptive sampling of stimuli for training a machine learning model that predicts a traffic entity's state of mind, in accordance with one or more embodiments.

FIG. 4 is a flowchart illustrating a method 400 for the adaptive sampling of stimuli for training a machine learning model that predicts a traffic entity's state of mind, in accordance with one or more embodiments.

The system generates 410 a training dataset for a subset of video frames (e.g., the subset of video frames 300), wherein the subset of video frames is described by at least one dimension attribute. The system generates a training dataset for the machine learning based model as follows. The system provides the subset of video frames for display to one or more users via a user interface. Each video frame may include a traffic entity, such as a pedestrian, bicyclist, or another vehicle. Through the user interface, the users may provide responses describing at least one hidden context attribute describing traffic entities in the video frames. The hidden context attributes may describe a state of mind of a human associated with the traffic entity, wherein a state of mind may include the human's intention to cross a path of the vehicle from which the video data is captured and the human's awareness of the vehicle, among other indications of state of mind. The system receives the user responses for each video frame of the subset of the video frames presented to the user and subsequently annotates each video frame based on the corresponding user response.

The system trains 420 the machine learning based model using the training dataset.

The system monitors 430 the performance of the model trained using the training dataset. The performance of the machine learning based model may be determined by evaluating how well the model predicts a hidden context attribute about a traffic entity's state of mind, the traffic entity displayed in a set of video frames that are input into the model. The model's performance may be determined by a measure of confidence and/or accuracy with which the machine learning based model outputs the hidden context attribute about a traffic entity.

The system identifies 440 a dimension attribute for which the model performs poorly. The system may identify video frames in response to which the model performs poorly and subsequently determine one or more dimension attributes that describe those video frames. A poor performance may be determined by determining that the performance of the model is below a threshold of a measure of performance such as confidence and/or accuracy. In some embodiments, the system may identify at least one dimension attribute determined to be rare. Rarity may be indicated by a low number of video frames having that dimension attribute. In some embodiments, the system may determine a number of previous video frames that had that dimension attribute that were presented to one or more users for user response. If the number of previous video frames is less than a predetermined threshold, the system may determine the dimension attribute to be rare. For example, hail may be rarely captured in video frames, which the system may determine as a dimension attribute for only a few video frames of the subset of video frames presented to the user. Accordingly, the system may assign hail as a rare dimension attribute.

The system subsequently selects 450 a second subset of video frames, wherein each of the video frames have the identified dimension attribute for which the model performed poorly. The identified dimension attribute may be associated with an identifier (e.g., a unique value).

The system generates 460 a second training dataset using the second subset of video frames, following the same method as in step 410 as described above. The system displays the second subset of video frames to one or more users via a user interface, receives responses from the users describing a hidden context attribute of traffic entities in each of the video frames of the subset of video frames, and annotates the video frames accordingly.

The system retrains 470 the machine learning based model based on the second training dataset. At this stage, the model's performance may be reevaluated. If model is found to perform below a threshold of a measure of performance, the system may once again repeat steps 440 through 450.

Figure 5:
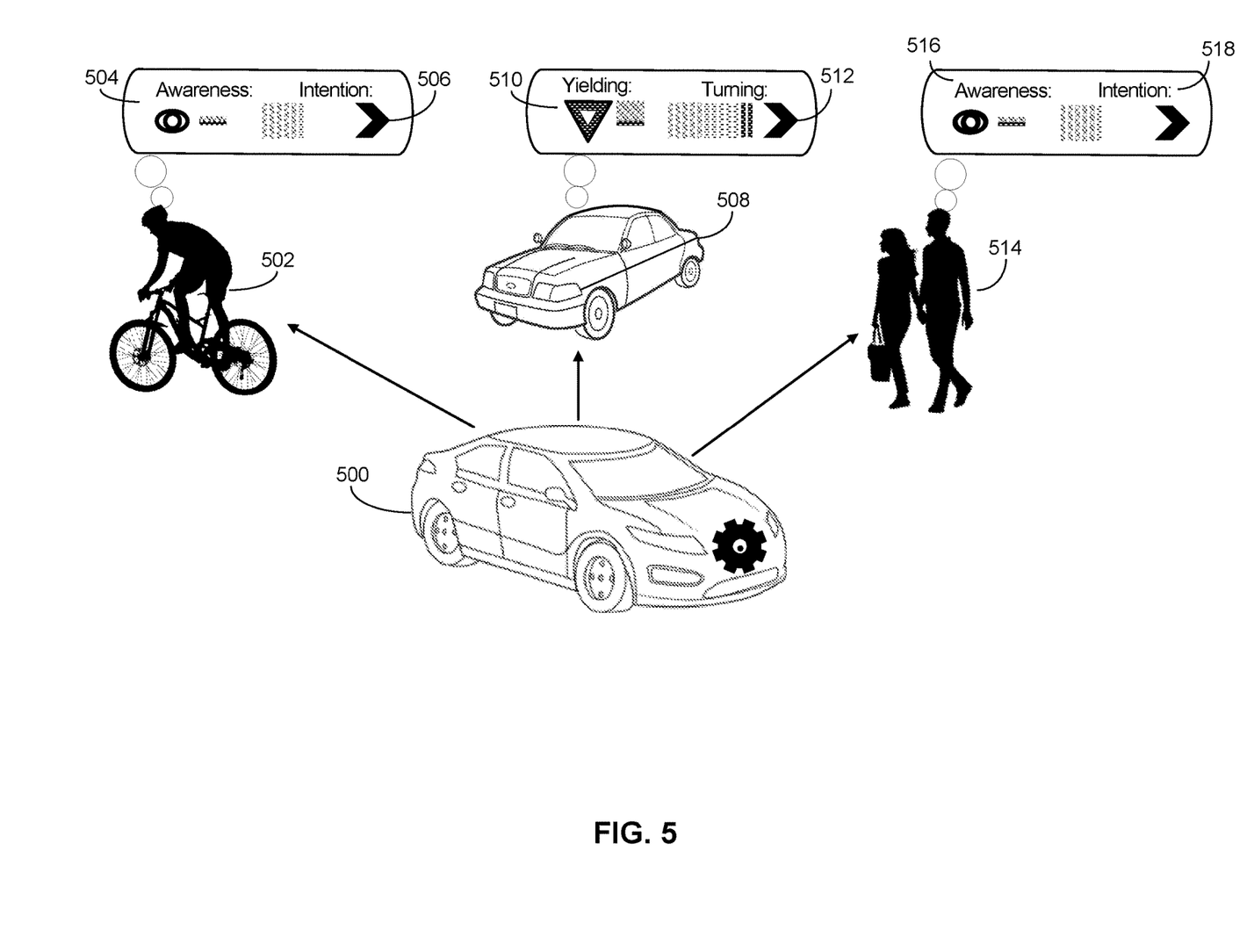
FIG. 5 is a diagram showing an example of an application of predicting a hidden context of a user in an automobile context, in accordance with one or more embodiments.

Once the model is found to perform above a threshold of performance, the system provides 480 the trained model to an autonomous vehicle to assist with navigation in traffic, as further described with respect to FIG. 5.

FIG. 5 is a diagram showing an example of an application of predicting a hidden context of a user in an automobile context, in accordance with one or more embodiments. FIG. 5 shows a vehicle 500 that may capture, via one or more cameras coupled to the vehicle 500, for example, a first traffic entity 502, a second traffic entity 508, and a third traffic entity 514 in an environment about the vehicle 500. The trained machine learning based model described in FIGS. 3-4 may be provided to the vehicle 500 to predict one or more hidden context attributes about the first traffic entity 502, the second traffic entity 508, and the third traffic entity 514. The hidden context attributes characterize a state of mind of the humans associated with the first traffic entity 502, the second traffic entity 508, and the third traffic entity 514, the state of mind comprising awareness of the vehicle 500 and an intention to move into a path of the vehicle 500. In some embodiments, the state of mind of the first traffic entity 502, the second traffic entity 508, and the third traffic entity 514 may include characteristics and intentions other than those listed herein. With respect to FIG. 5, the first traffic entity 502 is a bicyclist, the second traffic entity 508 is a vehicle, and the third traffic entity 514 is one or more pedestrians. Traffic entities may include other pedestrians and/or vehicles in the area, such as people on rollerblades, skateboards, and/or scooters in the area.

The machine learning based model takes as input video frames capturing each of the first traffic entity 502, the second traffic entity 508, and the third traffic entity 514. As discussed above, the machine learning based model is trained based on user responses on hidden context attributes of traffic entities in video frames. The model outputs a predicted distribution of user responses on the states of mind of traffic entities in the input video frames. The model may depict the predictions of hidden context attributes of the traffic entities via visual representations of awareness 504 and intention 506 for the first traffic entity 502, visual representations of willingness to yield 510 and desire to turn 512 for the second traffic entity 508, and visual representations of awareness 516 and intention 518 for the third traffic entity 514. The model's predictions of the hidden context attributes of traffic entities may be called summary statistics. The summary statistics show the system's prediction on a traffic entity's state of mind that is closely matched to the prediction that a human driver would make in that same situation.

In this example, the intention 506 of the first traffic entity 502 is relatively high, as indicated by the number of horizontal bars in the display. The system installed on the vehicle 500 also makes predictions about the awareness 504 of the first traffic entity 502 about the vehicle 500, by the same method described for intention. It also makes predictions about the willingness of a second traffic entity 508 to yield 510 or its desire to turn 512 across the path of the system-containing vehicle 500 by the same method described above. It also makes predictions about the intention 518 of the third traffic entity 514 to cross in front of the vehicle 500, and whether the third traffic entity is aware 516 of the vehicle 500, by the same method described above.

The models described above can be implemented as a real-time module that makes predictions of road user behavior based on input from cameras or other sensors installed on the vehicle 500. They can also be used to predict whether other road users would be surprised, welcoming, or aggressively unwelcoming if the car were to engage in maneuvers which would take it into the path of another road user (e.g., would an oncoming car yield if the car implementing the systems and methods described herein were to turn left.

Alternative Embodiments

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the Figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method comprising:
receiving a sequence of video frames captured by a camera mounted on an autonomous vehicle, each video frame displaying one or more traffic entities;
generating a training dataset for each of a first subset of video frames by:
providing the video frame for display to one or more users via a user interface;
receiving user responses describing a hidden context attribute describing a traffic entity displayed in the video frame; and
annotating the video frame based on the user responses describing the hidden context attribute;
training a machine learning based model using the training datasets associated with the first subset of video frames, the machine learning based model configured to receive an input video frame and predict a hidden context attribute describing a traffic entity displayed in the input video frame;
evaluating performance of the machine learning based model for the input video frame, the input video frame associated with one or more dimension attributes describing the input video frame;
responsive to the performance of the machine learning based model for the input video frame being below a threshold, identifying the one or more dimension attributes describing the input video frame;
selecting a second subset of video frames having the identified one or more dimension attributes;
generating a second training data set for each of the second subset of video frames by:
providing the video frame for display to one or more users via a user interface;
receiving user responses describing a hidden context attribute describing a traffic entity displayed in the video frame; and
annotating the video frame based on the user responses describing the hidden context attribute;
retraining the machine learning based model using the second training datasets associated with the second subset of video frames; and
providing the machine learning based model to an autonomous vehicle to assist with navigation in traffic.

2. The method of claim 1, further comprising:
determining that a dimension attribute describing the input video frame is rare based on a number of previous video frames having the dimension attribute that were provided to one or more users for user response used for training the machine learning based model; and
selecting the second subset of video frames to include one or more video frames having the rare dimension attribute.

3. The method of claim 1, wherein the one or more dimension attributes describing the input video frame are associated with a pedestrian.

4. The method of claim 1, wherein the one or more dimension attributes describing the input video frame are associated with an environment shown in the input video frame.

5. The method of claim 1, wherein the performance of the machine learning based model for the input video frame is measured by a confidence in predicting the hidden context attribute describing the traffic entity displayed in the input video frame.

6. The method of claim 1, wherein the performance of the machine learning based model for the input video frame is measured by an accuracy in predicting the hidden context attribute describing the traffic entity displayed in the input video frame.

7. The method of claim 6, wherein the hidden context attribute of the traffic entity includes a state of mind of a human associated with the traffic entity.

8. The method of claim 7, wherein the state of mind of the human comprises an intention of the traffic entity to cross a path of the autonomous vehicle.

9. The method of claim 1, wherein the traffic entity is one of a pedestrian, a bicyclist, or another vehicle.

10. A computer readable non-transitory storage medium storing instructions, the instructions when executed by a processor cause the processor to perform steps comprising:
receiving a sequence of video frames captured by a camera mounted on an autonomous vehicle, each video frame displaying one or more traffic entities;
generating a training dataset for each of a first subset of video frames by:
providing the video frame for display to one or more users via a user interface;
receiving user responses describing a hidden context attribute describing a traffic entity displayed in the video frame; and annotating the video frame based on the user responses describing the hidden context attribute;

training a machine learning based model using the training datasets associated with the first subset of video frames, the machine learning based model configured to receive an input video frame and predict a hidden context attribute describing a traffic entity displayed in the input video frame;

evaluating performance of the machine learning based model for the input video frame, the input video frame associated with one or more dimension attributes describing the input video frame;

responsive to the performance of the machine learning based model for the input video frame being below a threshold, identifying the one or more dimension attributes describing the input video frame;

selecting a second subset of video frames having the identified one or more dimension attributes;

generating a second training data set for each of the second subset of video frames by:
providing the video frame for display to one or more users via a user interface;
receiving user responses describing the hidden context attribute describing a traffic entity displayed in the video frame; and
annotating the video frame based on the user responses describing the hidden context attribute;

retraining the machine learning based model using the second training datasets associated with the second subset of video frames; and providing the machine learning based model to an autonomous vehicle to assist with navigation in traffic.

11. The computer readable non-transitory storage medium of claim 10, wherein the instructions cause the processor to perform steps further comprising:
determining that a dimension attribute describing the input video frame is rare based on a number of previous video frames having the dimension attribute that were provided to one or more users for user response used for training the machine learning based model; and
selecting the second subset of video frames to include one or more video frames having the rare dimension attribute.

12. The computer readable non-transitory storage medium of claim 10, wherein the one or more dimension attributes describing the input video frame are associated with a pedestrian.

13. The computer readable non-transitory storage medium of claim 10, wherein the one or more dimension attributes describing the input video frame are associated with an environment shown in the input video frame.

14. The computer readable non-transitory storage medium of claim 10, wherein the performance of the machine learning based model for the input video frame is measured by a confidence in predicting a hidden context attribute describing a traffic entity displayed in the input video frame.

15. The computer readable non-transitory storage medium of claim 10, wherein the performance of the machine learning based model for the input video frame is measured by an accuracy in predicting a hidden context attribute describing a traffic entity displayed in the input video frame.

16. The computer readable non-transitory storage medium of claim 15, wherein the hidden context attribute of the traffic entity includes a state of mind of a human associated with the traffic entity.

17. The computer readable non-transitory storage medium of claim 16, wherein the state of mind of the human comprises an intention of the traffic entity to cross a path of the autonomous vehicle.

18. The computer readable non-transitory storage medium of claim 10, wherein the traffic entity is one of a pedestrian, a bicyclist, or another vehicle.

19. A computer implemented system comprising:
a computer processor; and
a computer readable non-transitory storage medium storing instructions thereon, the instructions when executed by a processor cause the processor to perform steps of:
receiving a sequence of video frames captured by a camera mounted on an autonomous vehicle, each video frame displaying one or more traffic entities;
generating a training dataset for each of a first subset of video frames by:
providing the video frame for display to one or more users via a user interface;
receiving user responses describing a hidden context attribute describing a traffic entity displayed in the video frame; and
annotating the video frame based on the user responses describing the hidden context attribute;
training a machine learning based model using the training datasets associated with the first subset of video frames, the machine learning based model configured to receive an input video frame and predict a hidden context attribute describing a traffic entity displayed in the input video frame;
evaluating performance of the machine learning based model for the input video frame, the input video frame associated with one or more dimension attributes describing the input video frame;
responsive to the performance of the machine learning based model for the input video frame being below a threshold, identifying the one or more dimension attributes describing the input video frame;
selecting a second subset of video frames having the identified one or more dimension attributes;
generating a second training data set for each of the second subset of video frames:
providing the video frame for display to one or more users via a user interface;
receiving user responses describing the hidden context attribute describing a traffic entity displayed in the video frame; and
annotating the video frame based on the user responses describing the hidden context attribute;
retraining the machine learning based model using the second training datasets associated with the second subset of video frames; and
providing the machine learning based model to an autonomous vehicle to assist with navigation in traffic.

20. The computer implemented system of claim 19, wherein the instructions cause the processor to perform steps further comprising:
determining that a dimension attribute describing the input video frame is rare based on a number of previous video frames having the dimension attribute that were provided to one or more users for user response used for training the machine learning based model; and
selecting the second subset of video frames to include one or more video frames having the rare dimension attribute.

* * * * *

UNITED STATES PATENT AND TRADEMARK OFFICE
CERTIFICATE OF CORRECTION

PATENT NO. : 11,615,266 B2  
APPLICATION NO. : 17/081211  
DATED : March 28, 2023  
INVENTOR(S) : Avery Wagner Faller Page 1 of 1

It is certified that error appears in the above-identified patent and that said Letters Patent is hereby corrected as shown below:

On the Title Page

Item (71), in Column 1, in "Applicant", Line 1, delete "Automata Inc.," and insert -- Automata, Inc., --, therefor.

In the Claims

In Column 14, in Claim 1, Line 7, delete "data set" and insert -- dataset --, therefor.

In Column 15, in Claim 10, Line 20, delete "data set" and insert -- dataset --, therefor.

In Column 16, in Claim 19, Line 41, delete "data set" and insert -- dataset --, therefor.

In Column 16, in Claim 19, Line 42, delete "frames:" and insert -- frames by: --, therefor.

Signed and Sealed this  
Eighteenth Day of July, 2023

Katherine Kelly Vidal  
*Director of the United States Patent and Trademark Office*